(12) United States Patent  
Watanabe

(10) Patent No.: US 7,154,552 B1  
(45) Date of Patent: Dec. 26, 2006

(54) SOLID-STATE IMAGE PICKUP APPARATUS FOR GENERATING AN IMAGE SIGNAL BY ADDING OUTPUTS CORRESPONDING TO TWO TYPES OF LIGHT RECEIVING PIXELS HAVING DIFFERENT STORAGE TIME OF INFORMATION CHARGES

(75) Inventor: Tohru Watanabe, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/531,135

(22) Filed: Mar. 17, 2000

(30) Foreign Application Priority Data

Mar. 18, 1999 (JP) .................................. 11-073930

(51) Int. Cl.
- H04N 5/235 (2006.01)
- H04N 5/335 (2006.01)
- H04N 9/64 (2006.01)

(52) U.S. Cl. ..................... 348/362; 348/322; 348/249

(58) Field of Classification Search ............. 348/222.1, 348/317, 311, 294, 248, 249, 312, 322, 318, 348/320, 241, 362, 282; 257/222, 232, 231, 257/223, 230

See application file for complete search history.

(56) References Cited

U.S. PATENT DOCUMENTS

| | | | | |
|---|---|---|---|---|
| 4,608,608 A | * | 8/1986 | Nishizawa et al. | 348/207 |
| 4,614,966 A | * | 9/1986 | Yunoki et al. | 348/207 |
| 4,689,687 A | * | 8/1987 | Koike et al. | 348/207 |
| 4,839,734 A | * | 6/1989 | Takemura | 348/207 |
| 4,996,600 A | * | 2/1991 | Nishida et al. | 348/207 |
| 5,420,629 A | * | 5/1995 | Watanabe | 348/207 |
| 5,430,481 A | * | 7/1995 | Hynecek | 348/207 |
| 5,495,289 A | * | 2/1996 | Kumesawa | 348/241 |
| 5,572,256 A | | 11/1996 | Egawa et al. | 348/296 |
| 5,638,118 A | * | 6/1997 | Takahashi et al. | 348/207 |
| 5,883,667 A | * | 3/1999 | Taniji | 348/248 |
| 5,990,952 A | | 11/1999 | Hamasaki | 348/311 |
| 6,002,425 A | * | 12/1999 | Yamanaka et al. | 348/68 |
| 6,115,065 A | * | 9/2000 | Yadid-Pecht et al. | 348/308 |
| 6,441,851 B1 | * | 8/2002 | Yonemoto | 348/294 |
| 6,674,469 B1 | * | 1/2004 | Watanabe | 348/296 |
| 2002/0089598 A1 | * | 7/2002 | Ishimoto et al. | 348/311 |

FOREIGN PATENT DOCUMENTS

| JP | 7-87402 | 3/1995 |
|---|---|---|
| JP | 08-331461 | 12/1996 |

* cited by examiner

Primary Examiner—Vivek Srivastava  
Assistant Examiner—Justin Misleh  
(74) Attorney, Agent, or Firm—Hogan & Hartson LLP

(57) ABSTRACT

Two types of image signals are obtained from a solid-state image pickup device in a frame transfer system and subject to signal processing so as to extend the dynamic range. Two types of mutually different image signals are obtained from a solid-state image pickup device (11). The two types of image signals obtained through time division are matched in timing by a line memory (16). An arithmetic circuit (20) multiplies image data D1 with ratio R of storage times and subtracts image data D2 from the multiplication result R·D1 so as to generate smear data S0. The smear data S0 is multiplied with $1/(R-1)$ so as to generate smear data S representing the proper smear component. The smear data S is subtracted from image data D1 and D2, and the subtraction results are added to generate image data D3.

11 Claims, 6 Drawing Sheets

SOLID-STATE IMAGE PICKUP APPARATUS FOR GENERATING AN IMAGE SIGNAL BY ADDING OUTPUTS CORRESPONDING TO TWO TYPES OF LIGHT RECEIVING PIXELS HAVING DIFFERENT STORAGE TIME OF INFORMATION CHARGES

BACKGROUND OF THE INVENTION

1. Field of the Invention

The present invention relates to a solid-state image pickup apparatus configured using a solid-state image pickup device of the frame transfer system.

2. Description of the Prior Art(s)

FIG. 1 is a top plan view schematically showing a CCD solid-state image pickup device of the frame transfer system, and FIG. 2 is a timing chart illustrating the operation of the solid-state image pickup device.

The solid-state image pickup device of the frame transfer system comprises a light receiving section 1, a storage section 2, a horizontal transfer section 3, and an output section 4. The light receiving section 1 comprises a plurality of shift registers, having a plurality of consecutive bits in the vertical direction, arranged so as to be parallel to each other. Each bit of these shift registers forms a light receiving bit. Each light receiving bit generates and accumulates an information charge corresponding to an object image. The storage section 2 is formed from a plurality of shift registers consecutive to each shift register of the light receiving section 1. Each bit of these shift registers forms a storage bit, and each storage bit temporarily stores the information charge transferred from the light receiving section 1. The horizontal transfer section 3 comprises a single shift register, to which each bit is connected the respective output of the plurality of shift registers of the storage section 2, and receives, then sequentially transfers and outputs in the horizontal direction, one line at a time the information charges of one screen stored in the storage section 2. The output section 4 is formed from an electrically independent capacitor and an amplifier obtaining the change in electric potential of the capacitor, and the information charge that is output from the horizontal transfer section 3 is received at the capacitor one bit at a time and converted to a voltage value and output as image signal Y0.

To the light receiving section 1 is applied a frame transfer clock $\phi F$ for transferring at high speed the information charge of the light receiving section 1 to the storage section 2 within the blanking period of a vertical scan in synchronization with a vertical synchronization signal VD. To the storage section 2 is applied a vertical transfer clock $\phi V$ for loading the information charges that are transferred and output from the light receiving section 1 by the frame transfer clock $\phi F$ as well as for transferring the loaded information charges for one screen to the horizontal transfer section 3 one line at a time within the blanking period of a horizontal scan in synchronization with a horizontal synchronization signal HD. Then, to the horizontal transfer section 3 is applied a horizontal transfer clock $\phi H$ for transferring the information charges that are loaded into the horizontal transfer section 3 one line at a time in response to the vertical transfer clock $\phi V$ to the sequential output section 4 in synchronization with the horizontal synchronization signal HD. As a result, the information charges generated at the light receiving section 1, after being transferred to the storage section 2 in one-screen units, are transferred and output one line at a time to the output section 4 via the horizontal transfer section 3, and the image signal Y0 is output in consecutive one-line units.

Furthermore, a substrate clock $\phi B$, which rises for a predetermined period during the vertical scan period, is applied to the semiconductor substrate that forms the solid-state image pickup device. In response to the rise of the substrate clock $\phi B$, the frame transfer clock $\phi F$ is clocked at the same period as during frame transfer, and the information charges of the light receiving section 1 are completely discharged to the substrate. Therefore, a period L, from the completion of the discharge operation of information charges by the substrate clock $\phi B$ to the initiation of the transfer operation by the frame transfer clock $\phi F$, becomes the storage time of the information charges. The image signal Y0 represents a level that is proportional to the quantity of information charges stored in each light receiving pixel of the light receiving section 1 during the storage time L.

In the case of the solid-state image pickup device of the frame transfer system, the storage performance of the information charge of each light receiving pixel is attributed to the capacity of the potential well formed within the substrate by action of the transfer electrode located in the light receiving section 1. The capacity of this potential well is determined, for example, by the width of the transfer electrode and width of the transfer channel, and further the voltage of the pulse driving the transfer electrode.

When the width of the transfer electrode or width of the transfer channel narrows with the increased resolution of the solid-state image pickup device, the capacity of the potential well that is formed decreases and the storage performance of the information charge of each light receiving pixel lowers. Furthermore, when the driving pulse is lowered in voltage in order to reduce the power consumption of the device, the capacity of the potential well that is formed decreases further. Therefore, the dynamic range of the solid-state image pickup device becomes narrow and the image pickup conditions become restricted.

SUMMARY OF THE INVENTION

It is therefore an object of the present invention to extend the dynamic range of the solid-state image pickup device and perform image pickup operations over a wide range.

The present invention comprises a solid-state image pickup device in which a first light receiving pixel is arranged in a plurality of lines in one line units and a second light receiving pixel capable of being driven independently from the first light receiving pixel is arranged in at least one line units between first light receiving pixels of the plurality of lines, a drive circuit for driving the first and second light receiving pixels of the solid-state image pickup device and performing accumulation of the information charges at mutually different times between the first light receiving pixel and second light receiving pixel as well as transferring and outputting the information charges accumulated in the first and second light receiving pixels independently of each other, a timing control circuit for respectively setting the storage time of information charges at the first light receiving pixel and the storage time of information charges at the second light receiving pixel of the solid-state image pickup device, and a signal processing circuit for generating an image signal by adding a first output corresponding to the first light receiving pixel and a second output corresponding to the second light receiving pixel of the solid-state image pickup device.

According to the present invention, image signals are generated by adding together the outputs corresponding to two types of light receiving pixels for which the accumulation time of information charges can be set independently. Therefore, for an object of low brightness, a sufficient output can be obtained from a light receiving pixel for which a long accumulation time of information charges has been set, and for an object of high brightness, a wide range of image pickup is possible from a light receiving pixel for which a short accumulation time of information charges has been set.

DESCRIPTION OF THE PREFERRED EMBODIMENTS

Figure 3:
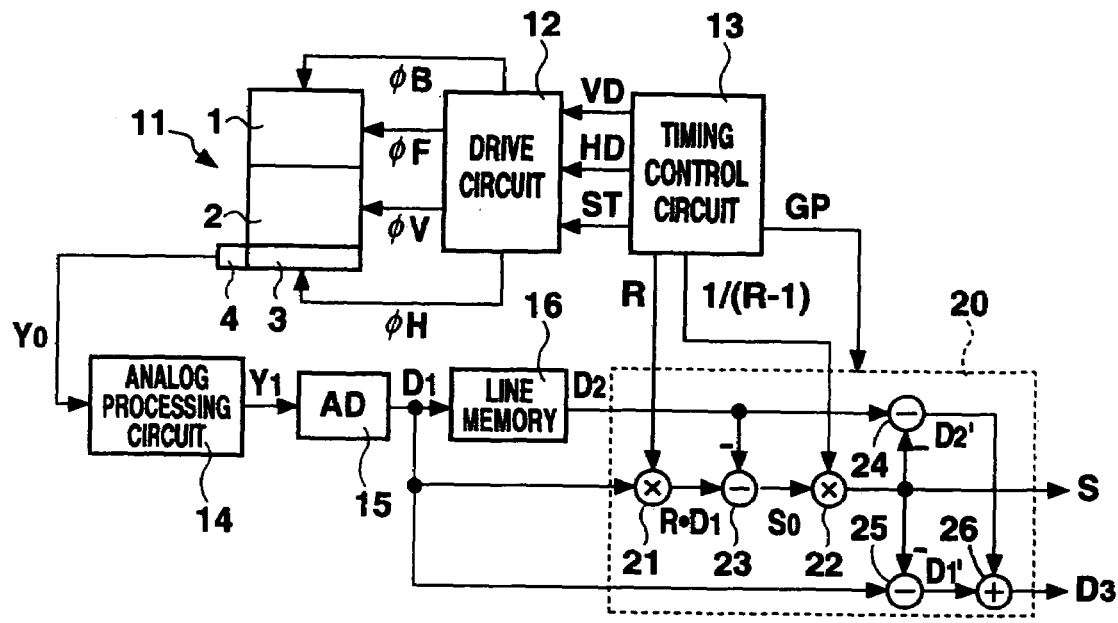
FIG. 3 is a block diagram showing a configuration of the solid-state image pickup device of the present invention.
Figure 4:
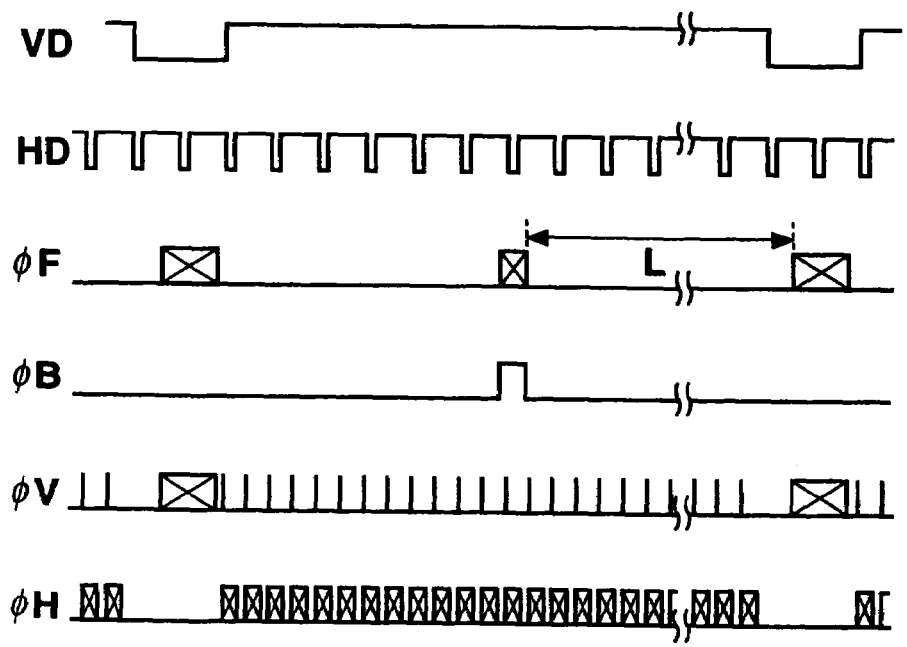
FIG. 4 is a timing chart illustrating the operation of the solid-state image pickup device of the present invention.

FIG. 3 is a block diagram showing the configuration of the solid-state image pickup device of the present invention and FIG. 4 is a timing chart illustrating the operation thereof.

Figure 1:
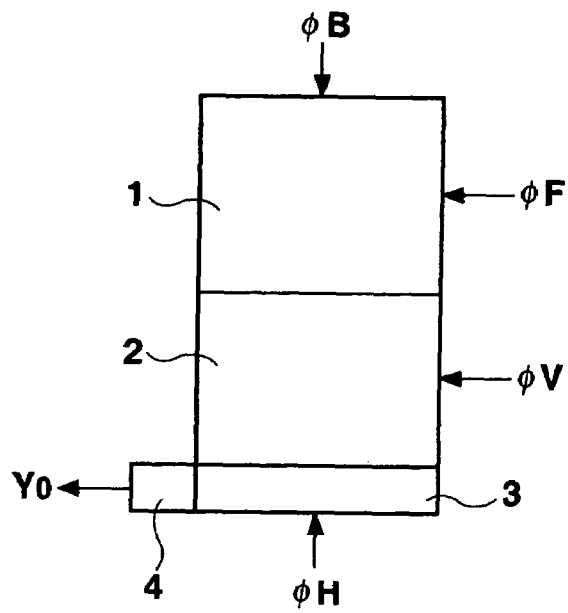
FIG. 1 is a schematic top plan view of a solid-state image pickup device of a frame transfer system.
Figure 2:
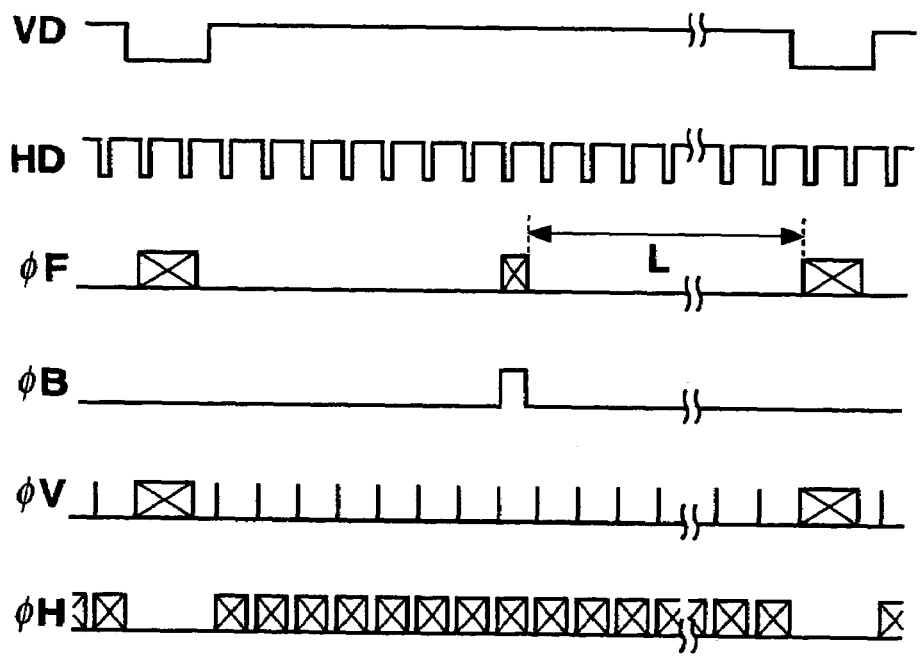
FIG. 2 is a timing chart illustrating the operation of the solid-state image pickup device of the frame transfer system.

A solid-state image pickup device 11 is identical to the solid-state image pickup device of the frame transfer system shown in FIG. 1, and comprises the light receiving section 1, the storage section 2, the horizontal transfer section 3, and the output section 4. A drive circuit 12 generates in response to various timing signals and supplies to the solid-state image pickup device 11 the frame transfer clock $\phi F$, the vertical transfer clock $\phi V$, the horizontal transfer clock $\phi H$, and the substrate clock $\phi B$. The frame transfer clock $\phi F$ is applied to the light receiving section 1, and the transfer electrode is clocked at a timing in accordance to the rise of the substrate clock $\phi B$ and the information charges of the light receiving section 1 are transferred at high speed to the storage section 2 within the blanking period of the vertical scan in synchronization with the vertical synchronization signal VD. The substrate clock $\phi B$ is applied to the semiconductor substrate forming the solid-state image pickup device, is made high for a predetermined period at a timing in accordance to a shutter timing signal ST, and causes the information charges of the light receiving section 1 to be discharged to the substrate by action of the frame transfer clock $\phi F$. Therefore, to each light receiving pixel of the light receiving section 1 are accumulated the information charges during the period L, from completion of the discharge operation by the substrate clock $\phi B$ to initiation of the transfer operation by the frame transfer clock $\phi F$.

The solid-state image pickup device 11 has an arrangement in the vertical direction of pixels, the number of which is at least twice the required number of scanning lines. Namely, a plurality of light receiving pixels arranged vertically corresponds to one scanning line. These light receiving pixels can be set so that the accumulation times of the information charges are mutually different, and for these light receiving pixels, at least two types of accumulation times are set. Accordingly, the shutter timing signal ST sets the timing of the shutter operation into multiple steps. The shutter operation in the present embodiment refers to the discharging of the information charges accumulated in a pixel and the transferring of the information charges of a particular pixel to another pixel. For example, pixels are arranged in the vertical direction, the number of which is twice the number of scanning lines for displaying the reproduction screen, and the accumulation times of the information charges are set independently for the odd-numbered lines and for the even-numbered lines. The following operation is given for the case where the light receiving pixels, the number of which is twice the number of the horizontal scanning lines, are arranged in the vertical direction, and the accumulation times for the information charges are set with a difference between the light receiving pixels of the odd-numbered lines and the light receiving pixels of the even-numbered lines.

The vertical transfer clock $\phi V$ is applied to the storage section 2, the information charges transferred and output from the light receiving section 1 by the frame transfer clock $\phi F$ are loaded to the storage section 2, and the loaded information charges for one screen are transferred one line at a time to the horizontal transfer section 3 at one half the period of the horizontal synchronization signal HD. The horizontal transfer clock $\phi H$ is then applied to the horizontal transfer section 3, the information charges loaded into the horizontal transfer section 3 are sequentially transferred to the output section 4 at every line in synchronization with the vertical transfer clock $\phi V$. As a result, the information charges accumulated at each light receiving pixel of the light receiving section 1 during the period L are transferred to the storage section 2 in one-screen units, then transferred and output one line at a time to the output section 4 via the horizontal transfer section 3, and the image signal Y0 is output in consecutive in one-line units.

A timing control circuit 13 generates and supplies to the drive circuit 12 the horizontal synchronization signal HD and vertical synchronization signal VD on the basis of a reference clock having a fixed period. Furthermore, the shutter timing signal ST, which rises during the vertical scan, is generated and supplied to the drive circuit 12. The shutter timing signal ST is a 2-bit signal, for example, and sets the timing of the shutter operation in two steps. A ratio R of the substantial accumulation times of the information charges generated from the delay in shutter operation is supplied to the arithmetic circuit 20 to be described hereinafter. At this time, a value $1/(R-1)$ is generated in correspondence to ratio R of the accumulation times and simultaneously supplied to the arithmetic circuit 20.

Figure 5:
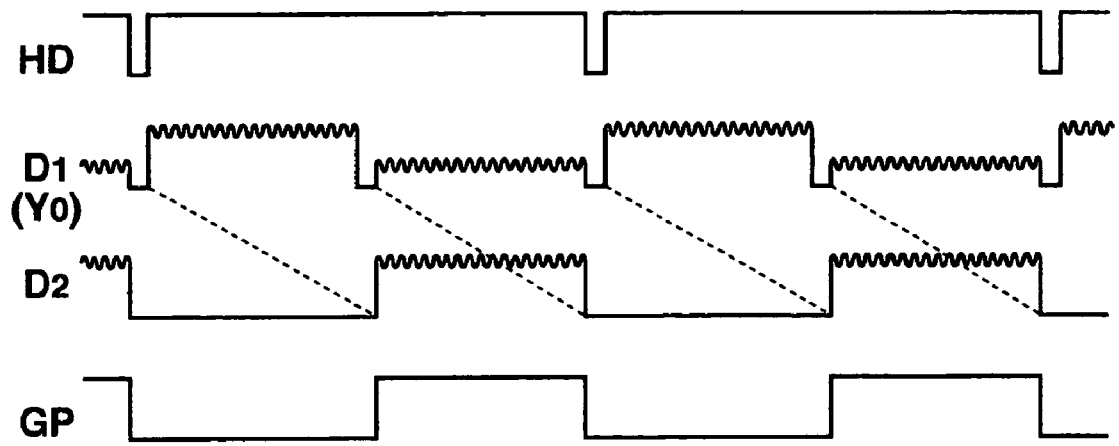
FIG. 5 is a waveform diagram of the image data in an analog representation.

An analog processing circuit 14 executes a sample and hold operation and various types of correction operations for the image signal Y0 that is input from the solid-state image pickup device 11 and generates an image signal Y1 conforming to a predetermined format. For example, to generate the image signal Y1, the sample and hold operation is performed at the timing for obtaining only the signal level for the image signal Y0 in which the reset level and signal level repeat in synchronization with the output operation of the solid-state image pickup device 11. An A/D converter circuit 15 synchronizes with the sample and hold operation of the analog processing circuit 14 and generates image data D1 representing information on each light receiving pixel of the solid-state image pickup device 11. At the solid-state image pickup device 11, in the case where the accumulation time of the information charges differs between the light receiving pixel of the odd-numbered lines and the light receiving pixel of the even-numbered lines, the image data D1 is obtained for two lines during the horizontal scan period as shown in FIG. 5. At this time, the level of the image data D1 for two lines obtained within the same horizontal scan period contains a difference proportional to the ratio of the accumulation times of the information charges in each light receiving pixel of the solid-state image pickup device 11.

A line memory 16 stores the image data D1 for one line during the first half of each horizontal scan period. The image data D1 stored in the line memory 16 is read out as the image data D2 after a delayed timing of half the horizontal scan period. The line memory 16 is configured, for example, by arranging in parallel two memory circuits, each having the capacity for storing one line of image data D1, so as to alternately perform read and write operations of the image data D1.

The arithmetic circuit 20, comprising first and second multipliers 21 and 22, first through third subtracters 23, 24, and 25, and an adder 26, operates during the period when a gate pulse GP rises and generates a smear data S and a third image data D3. The first multiplier 21 multiplies the ratio R that is input from the timing control circuit 13 with the first image data D1, and the first subtracter 23 subtracts the second image data D2 from the multiplication result R·D1 of the first multiplier 21. The second multiplier 22 multiplies 1/(R-1) that is input from the timing control circuit 13 with the subtraction result S0 of the first subtracter 23. The multiplication result of the second multiplier 22 is output as smear data. The second subtracter 24 subtracts the smear data S from the second data D2, and the third subtracter 25 subtracts the smear data S from the first data D1. The adder 26 then adds the subtraction result D2' of the second subtracter 24 and the subtraction result D1' of the third subtracter 25, and outputs the addition result as the third image data D3.

Figure 6:
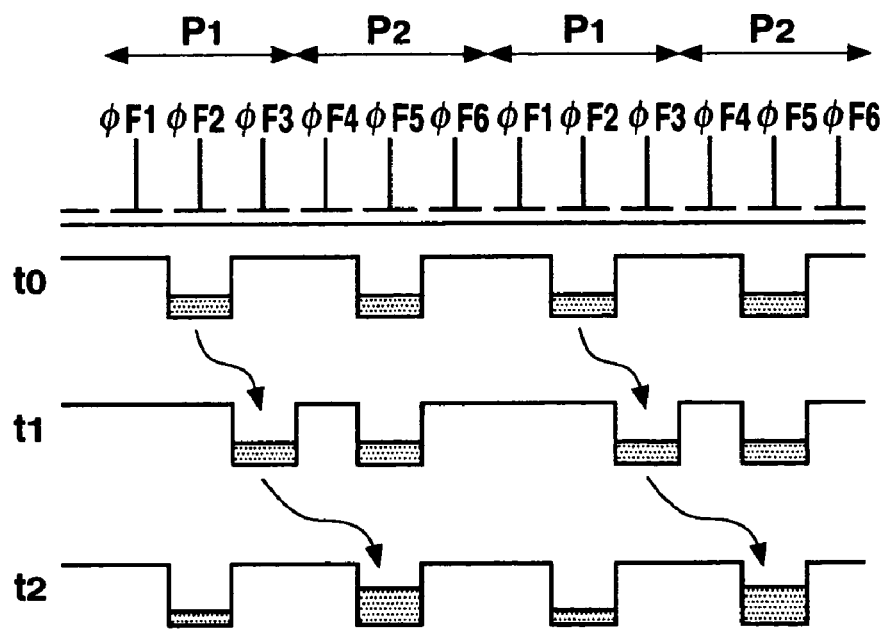
FIG. 6 is a potential diagram showing one example of the operation of the solid-state image pickup device of the present invention.
Figure 7:
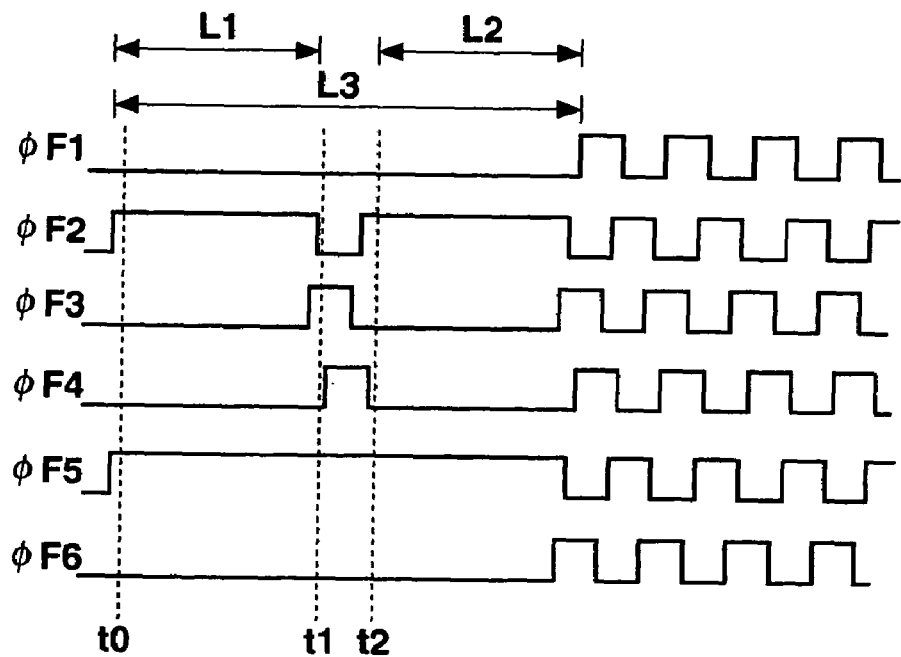
FIG. 7 is a waveform diagram of the transfer clocks achieving the operation of FIG. 6.

FIG. 6 is a potential diagram showing one example of a method for driving the solid-state image pickup device in the solid-state image pickup apparatus of the present invention, and FIG. 7 is a timing chart of the transfer clocks achieving the operation thereof. These figures illustrate the case where the light receiving pixels, the number of which is twice the number of scanning lines, are arranged in the vertical direction in the light receiving section 1 of the solid-state image pickup device 11, and the accumulation times of the information charges are set with a difference between the light receiving pixels of the odd-numbered lines and the light receiving pixels of the even-numbered lines.

In the light receiving section 1 of the solid-state image pickup device 11, a plurality of transfer electrodes are arranged in correspondence to six phases of transfer clocks $\phi 1$ through $\phi 6$, and with respect to the transfer electrodes of the six phases, two pixels P1 and P2 are substantially defined.

At the initiation of the first image pickup operation, the second transfer clock $\phi 2$ and the fifth transfer clock $\phi 5$ rise, and the potential levels under the respective transfer electrodes applied with the transfer clocks $\phi 2$ and $\phi 5$ are deeply formed. At this time, the other transfer clocks $\phi 1$, $\phi 3$, $\phi 4$, and $\phi 6$ remain low, and the potential levels under the transfer electrodes applied with the transfer clocks $\phi 1$, $\phi 3$, $\phi 4$, and $\phi 6$ remain shallow. As a result, at a timing to during the first charge accumulation period, potential wells are formed under the transfer electrodes applied with the transfer clocks $\phi 2$ and $\phi 5$, and at these potential wells are accumulated the information charges generated by photoelectric conversion.

At the elapse of a predetermined period L1 from the initiation of storage of the information charges, the third transfer clock $\phi 3$ rises, and in succession, the second transfer clock $\phi 2$ falls. At a timing t1 after the second transfer clock $\phi 2$ falls, the potential well storing information charges, along with the information charges accumulated in period L1, moves from under the transfer electrode applied with the second transfer clock $\phi 2$ to under the transfer electrode applied with the third transfer clock $\phi 3$. Furthermore, when the third transfer clock $\phi 3$ falls after the fourth transfer clock $\phi 4$ rises, the potential well, along with the information charges, moves from under the transfer electrode applied with the third transfer clock $\phi 3$ to under the transfer electrode applied with the fourth transfer clock $\phi 4$. At this time, the information charges accumulated in period L1 under the transfer electrode applied with the second transfer clock $\phi 2$ are combined with the information charges accumulated in the same period L1 under the transfer electrode applied with the fifth transfer clock $\phi 5$.

Then, after the second transfer clock $\phi 2$ is raised, the fourth transfer clock $\phi 4$ is lowered and the second image pickup operation is initiated. As a result, at a timing t2 during the charge accumulation period, similar to the case for timing t0, potential wells are formed under the transfer electrodes applied with the transfer clocks $\phi 2$ and $\phi 5$, and at these potential wells are again accumulated the information charges generated by photoelectric conversion. The second image pickup operation continues during period L2.

At the potential well under the transfer electrode applied with the second transfer clock $\phi 2$, information charges are hardly stored at the initiation of the second image pickup operation. As a result of this, at the potential well under the transfer electrode applied with the second transfer clock $\phi 2$, namely, the first light receiving pixel P1, are stored only the information charges generated during period L2, when the second storage operation is performed. On the other hand, at the potential well under the transfer electrode applied with the fifth transfer clock $\phi 5$ are stored the information charges accumulated in two potential wells in period L1, when the first image pickup operation was performed. As a result of this, at the potential well under the transfer electrode applied with the fifth transfer clock $\phi 5$, namely, the second light receiving pixel P2, the information charges generated during period L3 continuing from the first image pickup operation to the second image pickup operation are accumulated, and furthermore, the information charges generated at the first light receiving pixel P1 during period L1, when the first image pickup operation is performed, are added.

After completion of the above-mentioned first and second image pickup operations, the first through sixth transfer clocks $\phi 1$ through $\phi 6$ are clocked with a mutual phase difference of $2\pi/3$, and the information charges of the light receiving pixels P1 and P2 are transferred and output while respectively independent. As a result, the output corresponding to the first light receiving pixel P1 and the output corresponding to the second light receiving pixel P2, namely, the levels of image data D1 and D2 processed in the arithmetic circuit 20 show the following relationship in the period when the gate pulse rises:

$$D1:D2=L2:(L1+L3)$$

Figure 8:
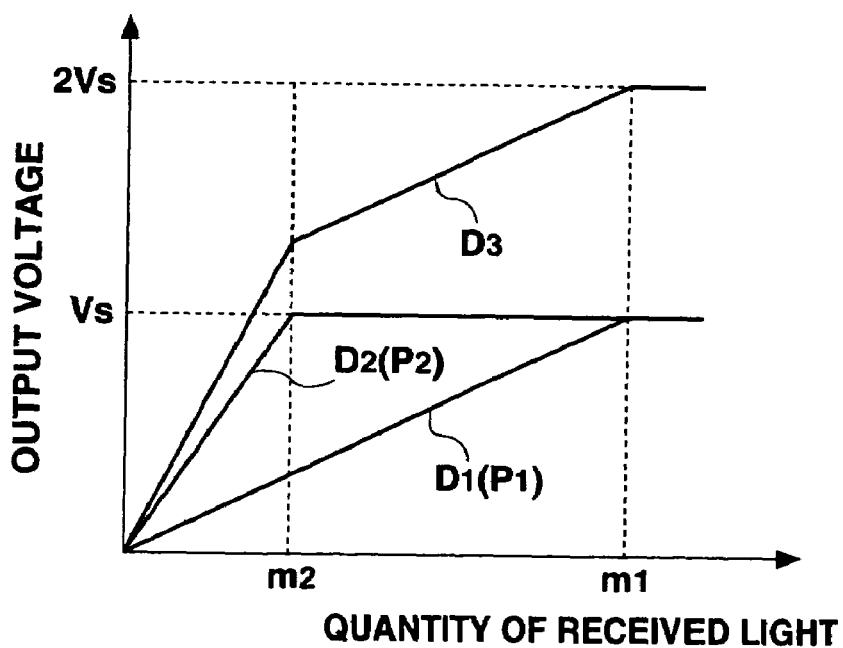
FIG. 8 shows a relationship between quantity of received light and output voltage.

Since the light receiving pixels P1 and P2 usually have equal storage capacities of information charges, the second light receiving pixel P2 becomes saturated at a small quantity of incident light. For example, as shown in FIG. 8, when the output voltage of the first light receiving pixel P1 reaches the saturation level Vs at a quantity of received light m1, the output voltage of the second light receiving pixel P2 reaches the saturation level Vs at a quantity of received light m2, which is smaller than the quantity of received light m1.

In the above-mentioned arithmetic circuit 20, the following processing is executed for the two types of image data D1 and D2. It is assumed here that the period L1 for performing the first image pickup operation and the period L2 for performing the second image pickup operation are equal, and the period required for transferring the information charge from the first light receiving pixel P1 to the second light receiving pixel P2 is sufficiently smaller than periods L1 and L2 and can thus be ignored. At this time, the ratio R that is input from the timing control circuit 13 is "3" and 1/(R−1) is "½".

Figure 9:
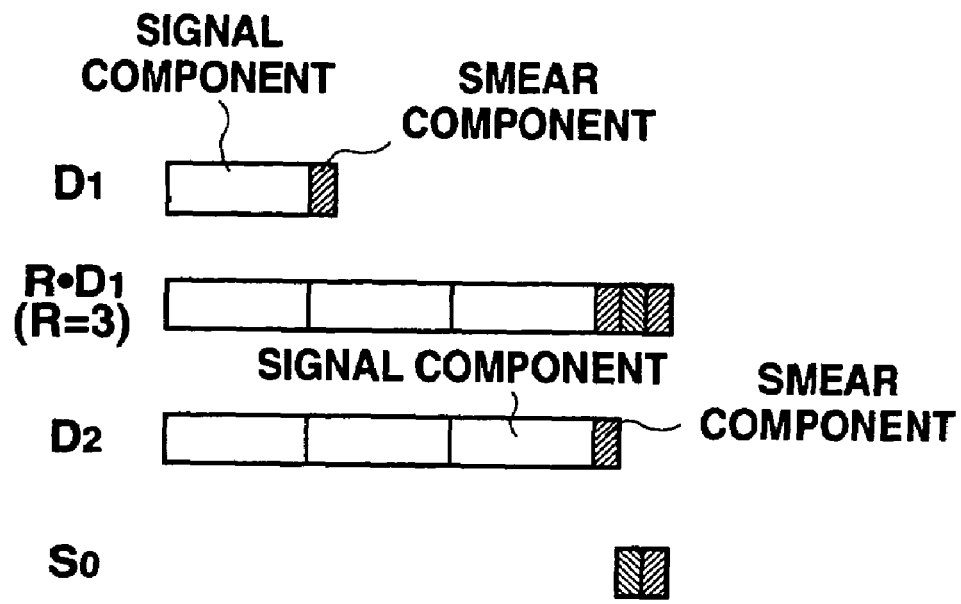
FIG. 9 shows a relationship between signal component and smear component.

First, the image data D1 is tripled at the first multiplier 21, and as shown in FIG. 9, the tripled image data 3D1 with a level matching that of the image data D2 is generated. Usually, each image data D1 and D2 contains the proper signal component and the smear component combined by the vertical transfer of information charges so that when the image data D1 is tripled, the smear component besides the signal component is also tripled. Accordingly, at the first subtracter 23, when the image data D2 is subtracted from the tripled image data 3D1, the signal component is canceled out leaving the smear component, thus generating the smear data S0. The smear data S0, which is the result of subtracting the singled smear component from the tripled smear component, actually represents a doubled value. Next, when the smear data S0 is multiplied by ½ at the second multiplier 22, the smear data S representing the actual smear component is generated.

At the second and third subtracters 24 and 25, the smear data S is respectively subtracted from the image data D1 and D2, and image data D1' and D2', which become only the signal components, are generated. The image data D1' and D2' are added together at the adder 26 where a third image data D3 is output.

The aforementioned third image data D3 is obtained by combining the two types of image data D1 and D2 having different light receiving sensitivities, and this substantially extends the dynamic range of the solid-state image pickup device. For example, as shown in FIG. 8, it is possible to vary the output voltage according to the quantity of received light until the quantity of received light reaches m1. If only the dynamic range is observed here, the first image data D1 varies over the same range. However, since the first image data D1 drops in light receiving sensitivity at low brightness, a sufficient output cannot be obtained when the quantity of received light is low. In the case of the third image data D3, the dynamic range can be extended while an output of sufficient level is obtained even at low brightness.

Furthermore, the third image data D3 has a different output voltage level with respect to the quantity of received light, namely, a different apparent light receiving sensitivity, when the quantity of received light is between 0 and m2, and when the quantity of received light is between m2 and m1.

However, from the fact that high sensitivity results when the quantity of received light is low and low sensitivity results when the quantity of received light is high, any visual deficiency in the reproduction screen can be eliminated if the ratio of periods L1 and L2, when the respective image pickup operations are performed, is optimized and the characteristics of the change in the output voltage with respect to the quantity of received light is approximated to the gamma correction curve.

Furthermore, since the smear data S is calculated at every line, the difference in the smear component in every line generated due to the difference in the transfer distance is correctly represented. Furthermore, since the timing at which this smear component is obtained is nearly identical to the timing at which the smear component is combined into the actual respective image signals of the odd-numbered lines and even-numbered lines, the influence of deterioration with time of the object is minimal.

Figure 10:
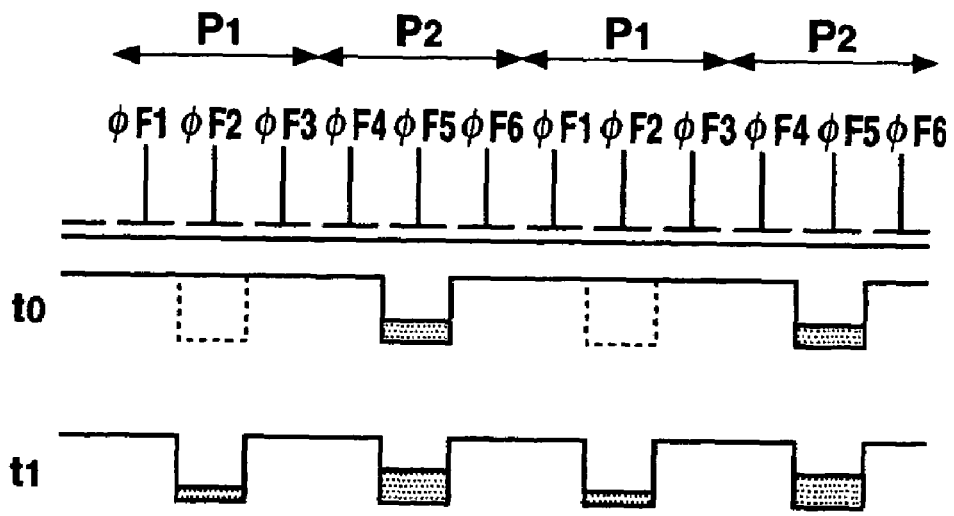
FIG. 10 is a potential diagram showing another example of the operation of the solid-state image pickup device of the present invention.
Figure 11:
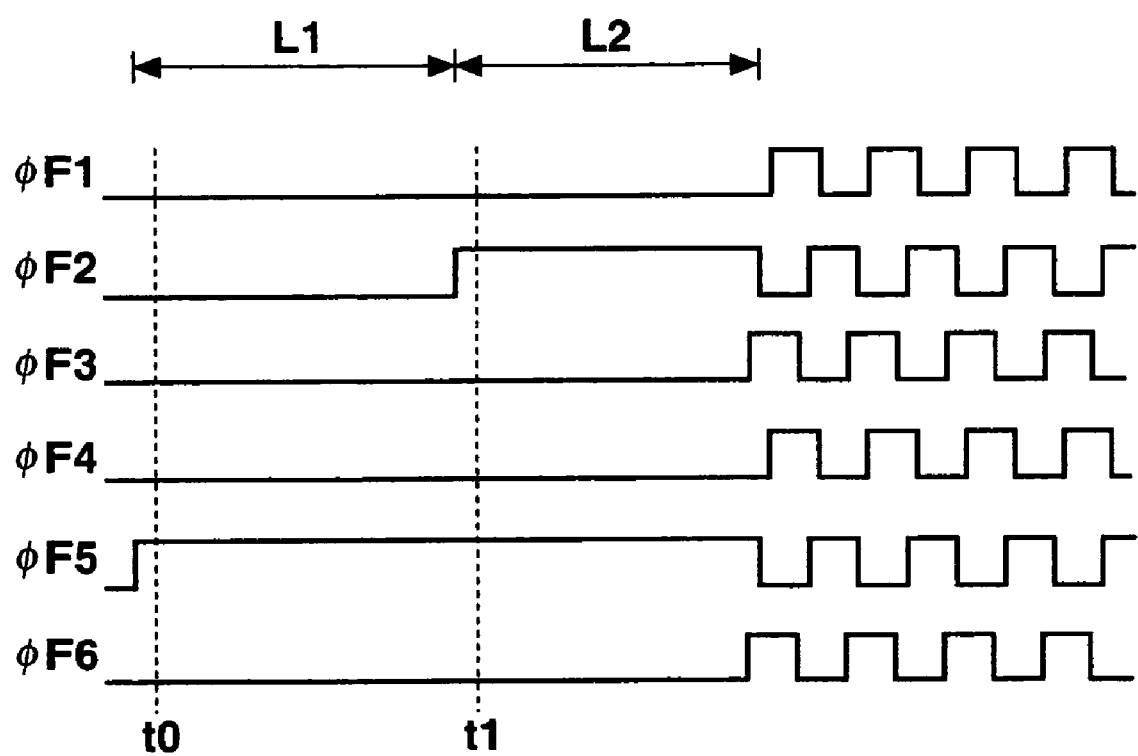
FIG. 11 is a waveform diagram of the transfer clocks achieving the operation of FIG. 10.

FIG. 10 is a potential diagram showing another example of a method for driving the solid-state image pickup device in the solid-state image pickup apparatus of the present invention, and FIG. 11 is a timing chart of the transfer clocks achieving the operation thereof. These figures, similar to FIG. 6 and FIG. 7, show the case where the light receiving pixels, the number of which is twice the number of scanning lines, are arranged in the vertical direction in the light receiving section 1 of the solid-state image pickup device 11, and the storage times of information charges are different between the light receiving pixels of the odd-numbered lines and the light receiving pixels of the even-numbered lines.

When the first image pickup operation is initiated, the fifth transfer clock $\phi 5$ rises, and the potential level under the transfer electrodes applied with the transfer clock $\phi 5$ is deeply formed. At this time, the other transfer clocks $\phi 1$ through $\phi 4$ and $\phi 6$ remain low, and the potential levels under the transfer electrodes applied with the transfer clocks $\phi 1$ through $\phi 4$ and $\phi 6$ remain shallow. As a result, at timing t0 during the first charge accumulation period, a potential well is formed under the transfer electrode applied with the fifth transfer clock $\phi 5$, and at this potential well are accumulated the information charges generated by photoelectric conversion.

The first image pickup operation completes at the elapse of period L1 from the initiation of accumulation of the information charges, and the second image pickup operation is initiated at the rise of the second transfer clock $\phi 2$. At the initiation of the second image pickup operation, only the second transfer clock $\phi 2$ rises, and the other transfer clocks $\phi 1$ and $\phi 3$ through $\phi 6$ remain the same as at the first image pickup operation. At timing t1 after the initiation of the second image pickup operation, a potential well storing the information charges is also formed under the transfer electrode applied with the second transfer clock $\phi 2$. As a result, at timing t2 during the charge storage period, a potential wells are formed under the respective transfer electrodes applied with the transfer clocks $\phi 2$ and $\phi 5$, and at these potential wells are again accumulated the information charges generated by photoelectric conversion. The second image pickup operation continues during the period L2.

At the potential well under the transfer electrode applied with the second transfer clock $\phi 2$, namely, the first light receiving pixel P1, are accumulated only the information charges generated during the period L2, when the second storage operation is performed. On the other hand, at the potential well under the transfer electrode applied with the fifth transfer clock $\phi 5$, namely, the second light receiving pixel P2, are accumulated the information charges generated through the period L1, when the first image pickup operation is performed, and the period L2, when the second image pickup operation is performed.

After the completion of the above-mentioned first and second image pickup operations, similar to the first embodiment, the first through sixth transfer clocks $\phi 1$ through $\phi 6$ are clocked with a mutual phase difference of $2\pi/3$, and the information charges of the light receiving pixels P1 and P2 are transferred and output while respectively independent. As a result, the output corresponding to the first light receiving pixel P1 and the output corresponding to the second light receiving pixel P2 show the following relationship:

$$P1:P2=L2:(L1+L2)$$

The image signals obtained in the above-mentioned manner, except for the fact that the ratio of the image signal level corresponding to the first light receiving pixel P1 to the image signal level corresponding to the second light receiving pixel P2 is different, can be handled in the same manner as the first embodiment. Therefore, expansion of the dynamic range of the solid-state image pickup device and detection of the smear component become possible.

It should be noted that while examples were given for the case where all lines of the light receiving pixels arranged in the light receiving section were assigned to the first and second light receiving pixels P1 and P2, two adjacent lines among light receiving pixels arranged with three or more consecutive lines may be assigned to the first and second light receiving pixels P1 and P2. For example, with four lines of light receiving pixels, the first light receiving pixel P1 is assigned to the first line, the second light receiving pixel P2 is assigned to the second line, and the third and fourth lines perform the storage of information charges individually without performing the combination of information charges from the other pixels.

Furthermore, the line memory 16 and the arithmetic circuit 20 may respectively comprise a memory circuit capable of storing image data D1 for a suitable number of lines, and a digital signal processing circuit for repeating the reading and writing of data to the memory circuit along with arithmetic operations.

According to the present invention, two types of image signals can be obtained from one solid-state image pickup device, and by executing arithmetic operations for these image signals, expansion of the dynamic range and detection of the smear component become possible.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A solid-state image pickup apparatus comprising:
a solid-state image pickup device in which a first light receiving pixel is disposed in a plurality of lines in one-line units, and a second light receiving pixel capable of being driven independently from said first light receiving pixel is disposed in at least one-line units between first light receiving pixels of the plurality of lines;
a drive circuit for driving the first and second light receiving pixels of said solid-state image pickup device and accumulating information charges at mutually different times between first light receiving pixel and second light receiving pixel, as well as transferring and outputting information charges accumulated in said first and second light receiving pixels independently of each other;
a timing control circuit, connected to the drive circuit, for respectively setting the storage time of information charges at the first light receiving pixel and the storage time of information charges at the second light receiving pixel of said solid-state image pickup device; and
a signal processing circuit for generating an image signal by adding a first output corresponding to the first light receiving pixel and a second output corresponding to the second light receiving pixel of said solid-state image pickup device;
wherein after driving the first and second light receiving pixels to accumulate information charges in the first and second light receiving pixels, the drive circuit adds information charges accumulated in the first light receiving pixel and information charges accumulated in the second light receiving pixel, and, the drive circuit drives the first and second light receiving pixels to further accumulate information charges in the first and second light receiving pixels and further adds information charges accumulated in the first light receiving pixels and the added information charges.

2. A solid-state image pickup apparatus comprising:
a solid-state image pickup device in which a first light receiving pixel is disposed in a plurality of lines in one-line units, and a second light receiving pixel capable of being driven independently from said first light receiving pixel is disposed in at least one-line units between first light receiving pixels of the plurality of lines;
a drive circuit for driving the first and second light receiving pixels of said solid-state image pickup device and accumulating information charges at mutually different times between first light receiving pixel and second light receiving pixel, as well as transferring and outputting information charges accumulated in said first and second light receiving pixels independently of each other;
a timing control circuit for respectively setting the storage time of information charges at the first light receiving pixel and the storage time of information charges at the second light receiving pixel of said solid-state image pickup device; and
a signal processing circuit for generating an image signal by adding a first output corresponding to the first light receiving pixel and a second output corresponding to the second light receiving pixel of said solid-state image pickup device;
wherein said signal processing circuit calculates vertical transfer smear component on the basis of a ratio of said respective accumulation times of information charges at said first and second light receiving pixels of said solid-state image pickup device and of a difference of said first and second outputs corresponding to said first and second light receiving pixels of said solid-state image pickup device.

3. The solid-state image pickup apparatus according to claim 2 wherein said signal processing circuit subtracts said vertical transfer smear component from said image signal on the basis of a ratio of said respective accumulation times of information charges at said first and second light receiving pixels of said solid-state image pickup device and of a difference of said first and second outputs corresponding to said first and second light receiving pixels of said solid-state image pickup device.

4. The solid-state image pickup apparatus comprising:
the solid-state image pickup device having a line of first light receiving pixels and a line of second light receiving pixels disposed so as to respectively correspond to horizontal scanning lines and capable of driving independently of each other said first light receiving pixels and said second light receiving pixels;
the drive circuit for driving said first and second light receiving pixels so that accumulation of information charges is performed at different times between said first light receiving pixels and said second light receiving pixels, as well as transferring and outputting independently of each other said information charges accumulated in said first and second light receiving pixels and generating the first output according to said information charges accumulated in said first light receiving pixels and the second output according to said information charges accumulated in said second light receiving pixels; and
the signal processing circuit for performing calculation of a smear quantity generated during vertical transfer of said information charges at said solid-state image pickup device on the basis of a ratio of said respective accumulation times of said information charges at said first and second light receiving pixels and of said first output and said second output.

5. The solid-state image pickup apparatus according to claim 4 wherein said signal processing circuit performs calculation of said smear quantity for every pair of said first light receiving pixel and said second light receiving pixel disposed so as to be in mutual proximity on same vertical transfer path.

6. The solid-state image pickup apparatus according to claim 4 wherein said signal processing circuit removes smear component included in at least said first output or said second output on the basis of said smear quantity of said calculation.

7. A solid-state image pickup apparatus comprising:
a solid-state image pickup device having a line of first light receiving pixels and a line of second light receiving pixels disposed so as to respectively correspond to horizontal scanning lines and capable of driving independently of each other said first light receiving pixels and said second light receiving pixels;
a drive circuit, connected to the solid-state image pickup device, for driving said first and second light receiving pixels so that accumulation of information charges is performed at different times between said first light receiving pixels and said second light receiving pixels, as well as transferring and outputting independently of each other said information charges accumulated in said first and second light receiving pixels and generating the first output according to said information charges accumulated in said first light receiving pixels and the second output according to said information charges accumulated in said second light receiving pixels; and
a signal processing circuit for generating an image signal by adding together said first output and said second output corresponding to identical horizontal scanning lines;
wherein after driving the first and second light receiving pixels to accumulate information charges in the first and second light receiving pixels, the drive circuit adds information charges accumulated in the first light receiving pixel and information charges accumulated in the second light receiving pixel, and, the drive circuit drives the first and second light receiving pixels to farther accumulate information charges in the first and second light receiving pixels and further adds information charges accumulated in the first light receiving pixels and the added information charges.

8. A solid-state image pickup apparatus comprising:
a solid-state image pickup device having a line of first light receiving pixels and a line of second light receiving pixels disposed so as to respectively correspond to horizontal scanning lines and capable of driving independently of each other said first light receiving pixels and said second light receiving pixels;
a drive circuit for driving said first and second light receiving pixels so that accumulation of information charges is performed at different times between said first light receiving pixels and said second light receiving pixels, as well as transferring and outputting independently of each other said information charges accumulated in said first and second light receiving pixels and generating the first output according to said information charges accumulated in said first light receiving pixels and the second output according to said information charges accumulated in said second light receiving pixels; and
a signal processing circuit for generating an image signal by adding together said first output and said second output corresponding to identical horizontal scanning lines;
wherein said signal processing circuit performs calculation of smear quantity generated during vertical transfer of said information charges at said solid-state image pickup device on the basis of a ratio of said respective accumulation times of said information charges at said first and second light receiving pixels and of said first output and said second output.

9. The solid-state image pickup apparatus according to claim 8 wherein said signal processing circuit performs calculation of said smear quantity for every pair of said first light receiving pixel and said second light receiving pixel disposed so as to be in mutual proximity on same vertical transfer path.

10. The solid-state image pickup apparatus according to claim 8 wherein said signal processing circuit removes smear component included in said image signal on the basis of said smear quantity of said calculation.

11. A solid-state image pickup apparatus, comprising:
a solid-state image pickup device in which a first light receiving pixel is disposed in a plurality of lines in one-line units, and a second light receiving pixel capable of being driven independently from said first light receiving pixel is disposed in at least one-line units between first light receiving pixels of the plurality of lines;
a drive circuit for driving the first and second light receiving pixels of said solid-state image pickup device and accumulating information charges at mutually different times between the first light receiving pixel and the second light receiving pixel; and
a timing control circuit, connected to the drive circuit, for respectively setting the storage time of information charges at the first light receiving pixel and the storage time of information charges at the second light receiving pixel of said solid-state image pickup device; wherein after driving the first and second light receiving pixels to accumulate information charges in the first and second light receiving pixels, the drive circuit adds information charges accumulated in the first light receiving pixel and information charges accumulated in the second light receiving pixel, and, the drive circuit drives the first and second light receiving pixels to further accumulate information charges in the first and second light receiving pixels and further adds information charges accumulated in the first light receiving pixels and the added information charges.

* * * * *